United States Patent
Park et al.

(10) Patent No.: US 10,225,601 B2
(45) Date of Patent: Mar. 5, 2019

(54) BROADCAST RECEIVING APPARATUS PROVIDING CONTENT ADVERTISEMENT ON ELECTRONIC PROGRAM GUIDE USER INTERFACE AND CONTROL METHOD THEREOF

(71) Applicant: SAMSUNG ELECTRONICS CO., LTD., Suwon-si (KR)

(72) Inventors: Ye-ji Park, Seoul (KR); Heui-jin Kwon, Seongnam-si (KR); Young-sun Kim, Suwon-si (KR); Myung-kwan Choi, Suwon-si (KR); A-rum Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/378,988

(22) Filed: Dec. 14, 2016

(65) Prior Publication Data
US 2017/0180781 A1    Jun. 22, 2017

(30) Foreign Application Priority Data
Dec. 17, 2015 (KR) .......................... 10-2015-0180938

(51) Int. Cl.
| | | |
|---|---|---|
| *H04N 21/431* | (2011.01) | |
| *H04N 21/81* | (2011.01) | |
| *H04N 21/433* | (2011.01) | |
| *H04N 21/482* | (2011.01) | |
| *H04N 21/658* | (2011.01) | |

(52) U.S. Cl.
CPC ....... *H04N 21/4312* (2013.01); *H04N 21/433* (2013.01); *H04N 21/4314* (2013.01); *H04N 21/4821* (2013.01); *H04N 21/6582* (2013.01); *H04N 21/812* (2013.01)

(58) Field of Classification Search
None
See application file for complete search history.

(56) References Cited

U.S. PATENT DOCUMENTS 6,177,931 B1 * 1/2001 Alexander ......... G06Q 30/0269
                                                         348/565
7,051,354 B2     5/2006 Mears
(Continued)

FOREIGN PATENT DOCUMENTS

| KR | 2001-0043170 A | 5/2001 |
|---|---|---|
| KR | 10-0694163 B1 | 3/2007 |

*Primary Examiner* — Hoang Vu A Nguyen Ba
(74) *Attorney, Agent, or Firm* — Sughrue Mion, PLLC

(57) ABSTRACT

A broadcast receiving apparatus is provided. The broadcast receiving apparatus may include a display, a storage configured to store a broadcast channel list and a CP channel list in which at least one of CP channels where content information provided by a content provider is mapped to is sequentially arranged, a communicator configured to communicate with a server providing Electronic Program Guide (EPG) information, an input interface configured to receive a user command and a processor configured to, in response to the user command being inputted, display an EPG UI including the broadcast channel list on the display, and the processor inserts a content advertisement including the CP channel information between broadcast channels included in a first page of the EPG UI and displays the content advertisement.

16 Claims, 22 Drawing Sheets

(56) References Cited

U.S. PATENT DOCUMENTS

| | | | |
|---|---|---|---|
| 8,635,649 B2 | 1/2014 | Ward, III et al. | |
| 2002/0073424 A1* | 6/2002 | Ward, III | H04N 5/44543 |
| | | | 725/42 |
| 2004/0045025 A1* | 3/2004 | Ward, III | G06Q 30/02 |
| | | | 725/42 |
| 2004/0205816 A1* | 10/2004 | Barrett | H04N 5/76 |
| | | | 725/49 |
| 2006/0117260 A1* | 6/2006 | Sloo | H04N 7/163 |
| | | | 715/719 |
| 2014/0089980 A1* | 3/2014 | Alexander | H04N 5/44543 |
| | | | 725/42 |
| 2015/0156548 A1* | 6/2015 | Sirpal | H04N 21/4858 |
| | | | 725/47 |
| 2016/0227270 A1 | 8/2016 | Knudson et al. | |

\* cited by examiner

BROADCAST RECEIVING APPARATUS PROVIDING CONTENT ADVERTISEMENT ON ELECTRONIC PROGRAM GUIDE USER INTERFACE AND CONTROL METHOD THEREOF

CROSS-REFERENCE TO RELATED APPLICATION

This application claims priority from Korean Patent Application No. 10-2015-0180938, filed in the Korean Intellectual Property Office on Dec. 17, 2015, the disclosure of which is incorporated herein by reference in its entirety.

BACKGROUND

1. Field

Aspects of the exemplary embodiments relate to a broadcast receiving apparatus and a control method thereof, and more particularly, to a broadcast receiving apparatus which provides an EPG service and a control method thereof.

2. Description of the Related Art

With the development of electronic technologies, various types of electronic apparatuses are developed and provided. In particular, display apparatuses such as a TV, a mobile phone, a PC, a laptop computer, a PDA, etc. are widely used in general households.

As the use of display apparatuses increases, users' needs for more various functions of display apparatuses also increases, and manufacturers continue to introduce display apparatuses with new functions in order to satisfy the users' needs.

Accordingly, a display apparatus now performs various functions. Particularly, a display apparatus such as a TV supports a function of Internet communication, thereby providing various CP contents provided by various content providers. As a result, a measure for providing many CP contents in an effective way is required.

SUMMARY

An aspect of the exemplary embodiments relates to a broadcast receiving apparatus which provides a content advertisement area on an EPG UI and a control method thereof.

According to an exemplary embodiment, there is provided a broadcast receiving apparatus including a display, a storage configured to store a broadcast channel list and a CP channel list in which at least one of CP channels where content information provided by a content provider is mapped to is sequentially arranged, a communicator configured to communicate with a server providing Electronic Program Guide (EPG) information, an input unit configured to receive a user command and a processor configured to, in response to the user command being inputted, display an EPG UI including the broadcast channel list on the display, and the processor inserts a content advertisement including the CP channel information between broadcast channels included in a first page of the EPG UI and displays the content advertisement.

The processor may insert into the EPG UI the content advertisement having a form in which a plurality of CP channels provided by the content provider are grouped, and provides the content advertisement.

The processor may, in response to information about the channel group being selected according to a user browsing command on the EPG UI, provide a channel list for browsing a plurality of CP channels within the channel group.

The processor, in response to returning to the first page on the EPG UI after a page conversion according to a user browsing command, control the content advertisement to disappear from the EPG UI.

The processor may, in response to returning to the first page on the EPG UI after a page conversion according to a user browsing command, provide a content advertisement which is different from the content advertisement initially provided.

The processor may display an area providing a continuous viewing function for viewing a content that has been displayed before the EPG UI is displayed, and in response to the content advertisement being selected, provide a content corresponding to the content advertisement selected in the continuous viewing area.

The processor may display an area providing a continuous viewing function for viewing a content that has been displayed before the EPG UI is displayed, and in response to a selection GUI being positioned on the content advertisement, provide a content corresponding to the content advertisement in the continuous viewing area.

The processor may, in response to the selection GUI returning to the broadcast channel on the EPG UI, provide a continuous viewing function for viewing the content that has been provided before the EPG UI is displayed within the continuous viewing area.

A control method of the broadcast receiving apparatus storing a broadcast channel list and a CP channel list in which at least one of CP channels where content information provided by a content provider is mapped to is sequentially arranged, the control method, including receiving a user command input for displaying an Electronic Program Guide (EPG) UI including a broadcast channel list, and in response to the user command input, inserting a content advertisement including the CP channel information between broadcast channels included in a first page of the EPG UI and displaying the content advertisement.

The displaying the EPG UI screen may insert into the EPG UI the content advertisement having a form in which a plurality of CP channels provided by the content provider are grouped and provides the content advertisement.

The control method may further include, in response to information about the channel group being selected according to a user browsing command on the EPG UI, providing a channel list for browsing a plurality of CP channels within the channel group.

The control method may further include, in response to returning to the first page on the EPG UI after a page conversion according to a user browsing command, controlling the content advertisement to disappear from the EPG UI.

The control method may further include, in response to returning to the first page on the EPG UI after a page conversion according to a user browsing command, providing a content advertisement which is different from the content advertisement initially provided.

Here, the EPG UI screen may include an area providing a continuous viewing function for viewing a content that has been displayed before the EPG UI is displayed, and the method may further include, in response to the content advertisement being selected, providing a content corresponding to the content advertisement in the continuous viewing area.

The EPG UI screen may include an area providing a continuous viewing function for viewing a content that has been displayed before the EPG UI is displayed, and the method may further include, in response to a selection GUI being positioned on the content advertisement, providing a content corresponding to the content advertisement in the continuous viewing area.

The control method may further include, in response to the selection GUI returning to the broadcast channel on the EPG UI, providing a continuous viewing function for viewing the content that has been displayed before the EPG UI is displayed.

According to the various exemplary embodiments described above, CP content information may be naturally exposed by assigning an advertisement area for a CP content on an EPG UI, thus, a content provider's convenience and a user's convenience may be improved.

DETAILED DESCRIPTION OF EXEMPLARY EMBODIMENTS

Hereinafter, various exemplary embodiments will be described in more detail with reference to the accompanying drawings.

Figure 1:
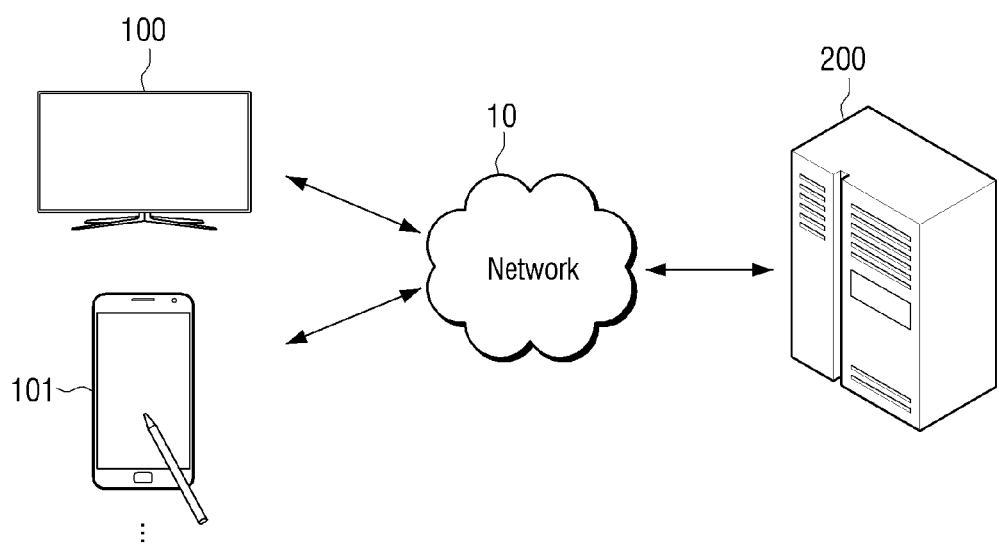
FIG. 1 is a diagram for describing a display system according to an exemplary embodiment.

FIG. 1 is a diagram for describing an electronic system according to an exemplary embodiment.

According to FIG. 1, the electronic system includes a broadcast receiving apparatus 100 and a server 200 according to an exemplary embodiment.

The broadcast receiving apparatus 100 may be implemented by a digital TV, but not limited thereto. The broadcast receiving apparatus 100 may be implemented by various types of apparatuses having a display function such as a smart phone 101, a tablet, a PC, a PMP, a PDA, a navigation, or the like.

For instance, the broadcast receiving apparatus 100 may be implemented to provide an Internet Protocol (IP) TV service based on an Internet. Specifically, the broadcast receiving apparatus 100 may provide not only a real-time broadcasting service, but also a Video On Demand (VOD) service, a Digital Video Recorder (DVR) service, a service of transmitting an instant message through a TV screen, etc., but not limited thereto. The broadcast receiving apparatus 100 may also be implemented to provide services such as a cable TV service using a cable network, a satellite TV service using a satellite, a satellite DMB service and the like.

Meanwhile, the broadcast receiving apparatus 100 may receive an Electronic Program Guide (EPG) information from an external source, and provide an EPG UI based on the received EPG information. Here, the EPG information may be received from various service providers providing a TV service. For example, the EPG information may be received from a Program Provider (PP) providing a TV service including a terrestrial broadcasting service, a service provider providing an IPTV service, a TV manufacturer or the like. The EPG information may be directly received through a terrestrial wave depending on a service provided by a TV, but may also be received from a server 200 providing an IPTV service or a TV manufacturer server 200 through a network 10.

An EPG information is information about a broadcasting program schedule provided on a TV screen. Through the information, a user can check what program is to be broadcast on which broadcasting station on that day or a week later briefly, and if a user assigns a program that a user wants to watch, more detailed program information can be provided. Also, depending on a service, a user can assign a program, and make a reservation for watching the program or record the program. For instance, the EPG information may include additional information such as a channel name, a title of a program, a broadcasting time of a program, episode information of a program, information about casts, and the like.

Hereinafter, various methods for providing an EPG UI will be described according to various exemplary embodiments with reference to the accompanying drawings.

Figure 2:
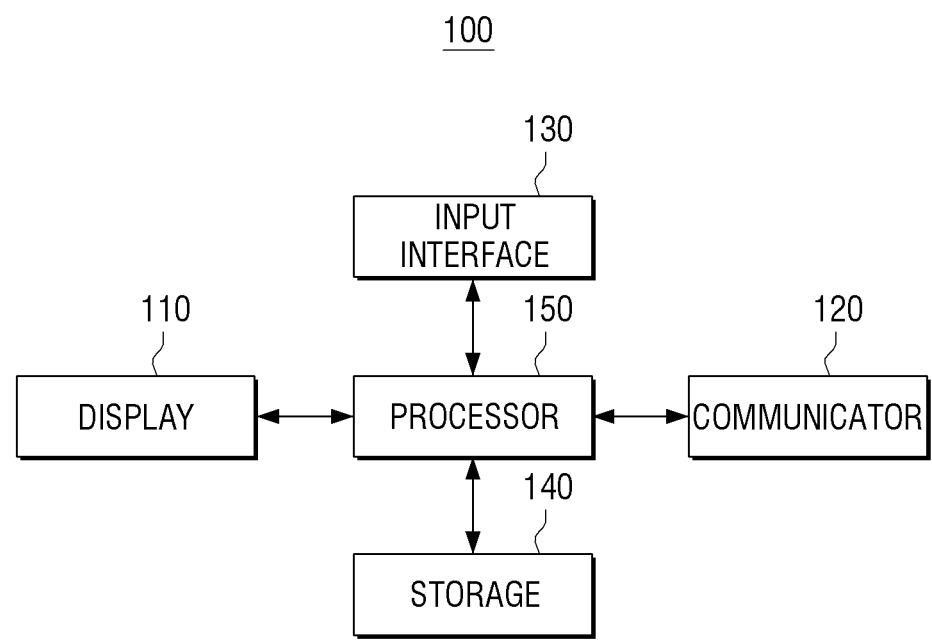
FIG. 2 is a block diagram illustrating a configuration of a broadcast receiving apparatus according to an exemplary embodiment.

FIG. 2 is a block diagram illustrating a configuration of a broadcast receiving apparatus according to an exemplary embodiment.

According to FIG. 2, the broadcast receiving apparatus 100 includes a display 110, a communicator 120, an input interface 130 and a processor 140, but not limited thereto. If necessary, other configurational elements may be added or excluded, and some elements may be implemented by one chip in a form of a SOC.

A display 110 displays a screen. A screen here may include various contents such as an image, a moving image, text, music, etc., an application execution screen including various contents, a Graphic User Interface (GUI) page and the like.

Specifically, the display 100 displays an Electronic Program Guide (EPG) UI including a broadcast channel list depending on a preset event. The preset event here may be, for example, the case in which a user command is inputted for displaying an EPG UI, or the case in which a channel zapping command is maintained for more than a preset time, but not limited thereto. In some cases, it may be various events such as an event of turning on the broadcast receiving apparatus 100, an event in which a user command is not inputted during a preset time, and the like.

Meanwhile, the display 110 may be implemented by a Liquid Crystal Display (LCD) or an Organic Light Emitting Diodes (OLED) panel, but not limited thereto.

A communicator 120 performs communication with various external devices including a server 200.

The communicator 120 may communicate with an external device using a wire/wireless local area network (LAN), a wide area network (WAN), Ethernet, Bluetooth, ZigBee, IEEE 1394, Wi-Fi, a power line communication (PLC) and the like.

In particular, the communicator 120 may manage EPG information, CP content information, a CP content, etc., and provide respective information to the broadcast receiving apparatus 100 according to a preset event.

Meanwhile, it is described that the communicator 120 is one configurational element in the above example, but in the case in which a server is implemented by a plurality of servers (e.g., an EPG providing server and a CP content providing server) according to an exemplary embodiment, the communicator 120 can be implemented as a separate communicator which communicates with each server. In this case, a communication method for communicating with each server may be identical to one another, but may also be different from one another.

The input interface 130 may receive various user commands.

In particular, the input interface 130 may receive a user command for displaying an EPG UI, a user browsing command on an EPG UI (e.g., a content browsing command, a channel browsing command, etc.), a channel zapping command, a content selection command, a user command for displaying a variety of other UI screens, various user manipulation commands on a respective UI screen, and the like. The input interface 130 may also receive a user command for changing a mode of the broadcast receiving apparatus 100 and various user commands related to changing a GUI.

The input interface 130 may be implemented in various forms according to an exemplary embodiment of the broadcast receiving apparatus 100. For instance, in the case in which the broadcast receiving apparatus 100 is implemented as a digital TV, the input interface 130 may be implemented as a receiver of a remote controller receiving a remote control signal, but not limited thereto. The input interface 130 may be implemented as a camera receiving a user motion input, a microphone receiving a user voice input, a key provided in a panel or the like.

The storage 140 stores various data such as an OS (Operating System) software module for operating the broadcast receiving apparatus 100, various applications, various contents inputted or set while an application is operated, various content information, EPG information received from an external source, and the like.

Particularly, the storage 140 may store a broadcast channel list and a CP channel list in which at least one of CP channels where a CP content is mapped to is sequentially arranged.

Here, the storage 140 may include at least one of an internal memory or an external memory. For example, an internal memory may include at least one of a volatile memory (e.g., a dynamic RAM [DRAM], a static RAM [SRAM], a synchronous dynamic RAM [SDRAM], etc.), a non-volatile memory (e.g., a one-time programmable ROM [OTPROM], a programmable ROM [PROM], an erasable and programmable ROM [EPROM], an electrically erasable and programmable ROM [EEPROM], a mask ROM, a flash ROM), and a flash memory (e.g., a NAND flash or a NOR flash, etc.), a hard drive, or a solid state drive (SSD).

An external memory may include a flash drive, for example, a compact flash (CF), a secure digital (SD), a micro secure digital (Micro-SD), a mini secure digital (Mini-SD), an extreme digital (xD), a multi-media card (MMC), a memory stick and the like. The external memory may be functionally and/or physically connected with the broadcast receiving apparatus 100 through various interfaces.

The processor 150 controls an overall operation of the broadcast receiving apparatus 100. Here, the processor 150 may include one or more of a central processing unit (CPU), a controller, an application processor (AP) or a communication processor (CP), an ARM processor.

In particular, the processor 150 may, when an event of displaying an EPG UI including a broadcast channel list (e.g., an event where a user command for displaying an EPG UI is inputted) occurs, control the display 110 to display a content advertisement provided by a content provider between broadcast channels comprising a broadcast channel list.

In particular, the processor 150 may insert an advertisement of a content provided by a content provider (hereinafter, referred to as a CP content for convenience of explanation) between broadcast channels included in a first page of an EPG UI, and display the content advertisement.

Specifically, the processor 150 may insert at least one of CP channels comprising a CP channel list between two broadcast channels included in a first page of an EPG UI, and provide the EPG UI.

Here, a CP content is a content that a provider produces him/herself and provides. In general, a CP content may be a multimedia content provided through an Internet, but not limited thereto. For example, a CP content may be a content such as a news, a TV drama, a game and the like. Meanwhile, an event of displaying an EPG UI may be an input by a certain button provided in a remote controller.

In the above case, the processor 150 may provide a channel providing a CP content or a CP content provided by a content provider in a form of a channel which a user can interface him/herself along with a previous broadcast channel. For example, the processor 150 may dispose a channel providing a CP content on the rear end of a previous broadcast channel on an EPG UI and provide the channel, but as the number of channels is growing these days, a user rarely browses an EPG UI on the rear end of a previous broadcast channel. Therefore, in an exemplary embodiment, information about a CP content channel or a CP content is provided on an area of an EPG UI currently displayed on a screen, thereby providing a CP content recommendation effect or a CP content advertisement effect.

Meanwhile, a CP content advertisement may include various information about a CP content. According to an exemplary embodiment, the processor 150 may provide a CP content advertisement in an identical form to another broadcast channel on an EPG UI. That is, the processor 150 may provide a CP content advertisement to an area having a same size as the size of another broadcast channel on an EPG UI in a form in which a name of a channel, a name of a program, etc. are included, and in some cases, a channel number may also be included.

According to an exemplary embodiment, the processor 150 may insert into an EPG UI a content advertisement having a form in which a plurality of content advertisements provided by at least one of content providers are grouped and provide the content advertisement.

For instance, each of a first CP channel and a second CP channel provided by a content provider A may be provided between existing broadcast channels in a form of a channel on an EPG UI, but also a plurality of CP channels provided by the content provider A may be grouped and provided in a form of one channel. Of course, according to an agreement between content providers, a plurality of CP channels provided by each different content provider may also be grouped and provided in a form of one channel.

Also, the processor 150 may, when information about a group of content advertisements is selected according to a user browsing command, provide a content advertisement list for browsing a plurality of content advertisements within a group of content advertisements. A content advertisement list here may be, for example, a channel list in which a plurality of CP channels providing at least one CP channel each are sequentially arranged.

Here, a content advertisement list may be provided through a list UI which is separate from an EPG UI, but may also be provided in a form in which each of a plurality of content advertisements within a content advertisement group are listed up in a form of a channel. In the case of the latter, the content advertisement list in an EPG page may be a page in which CP channels providing an actual respective content are mapped to within an EPG, but in some cases, a content advertisement list may be provided with CP channel information which belongs to a respective content advertisement group inserted in the list.

The processor 150 may, after a page conversion according to a user browsing command on an EPG UI, in the case of returning to an original page (e.g., a first page of an EPG UI), control a CP content advertisement displayed in a form of a channel to disappear. For instance, after moving onto a previous page or a next page according to a user browsing command while a CP content advertisement is displayed on an EPG UI, and in the case of returning to a page including the original CP content advertisement, the processor 150 may not display the respective CP content advertisement. This reflects the fact that a user is not interested in the CP content because a user did not select a respective CP content advertisement even though the respective CP content advertisement has been displayed once.

However, it is not limited to the above example, but the processor 150 may also provide a respective CP content as many as a preset times. For instance, in the case of returning to a respective EPG page for the first time, the processor 150 may display a respective CP content advertisement, and in the case of returning to a respective EPG page for the second time, the processor 150 may control the respective CP content advertisement to disappear.

Or, the processor 150 may, after a page conversion according to a user browsing command on EPG UI, in the case of returning to an original page, maintain a CP content advertisement displayed in a form of a channel and provide the CP content advertisement.

Or, the processor 150 may, after a page conversion according to a user browsing commend on an EPG UI, in the case of returning to an original page, provide a CP content advertisement which is different from the CP content advertisement initially provided.

The processor 150 may also display through the display 110 an area providing a continuous viewing function for viewing a content that has been displayed before an EPG UI is displayed. In this case, the processor 150 may provide a content corresponding to a respective CP content advertisement within the continuous viewing area.

For example, the continuous viewing area which is a window for maintaining an experience of broadcasting may be provided by continuously providing on a part of an EPG UI a content that a user has been viewed right before the EPG UI is displayed. In the continuous viewing area, a preview may be provided for a program selected according to a browsing command on an EPG UI.

According to an exemplary embodiment, after a cursor (or a highlight) is positioned on a respective CP content advertisement on an EPG UI, if there is an input by a separate select button, the processor 150 may provide a CP content corresponding to a CP content advertisement selected within a continuous viewing area. Here, a CP content provided within a continuous viewing area may be a form in which a respective CP content is played, or may be a form in which a thumbnail image or a preview image of a respective CP content is provided. This is to provide an opportunity of selection to a user by providing a preview without converting into a full page right away even though a respective CP content advertisement is selected. In this case, the processor 150 may provide a respective CP content in a full page if there is an additional event (e.g., an input by a select key again).

Or, when a selection GUI is positioned on a CP content advertisement, the processor 150 may provide a CP content corresponding to a CP content advertisement within a continuous viewing area.

For example, after a cursor (or a highlight) is positioned on a respective content advertisement on an EPG UI, even though there is no input by a select button, the processor 150 may provide a CP content corresponding to a CP content advertisement within a continuous viewing area, and thereby maximizing an advertisement effect. Here, a CP content provided within a continuous viewing area may be a form in which a respective CP content is played, or may be a form in which a thumbnail of a respective CP content is provided.

In the case in which a cursor (or a highlight) is positioned on a selection GUI on a CP content advertisement, and a cursor (or a highlight) returns to a broadcast program on an EPG UI while a CP content corresponding to the CP content advertisement is provided within a continuous viewing area, the processor 150 may provide a content which has been provided within a continuous viewing area, that is, a broadcast content which has been provided before an EPG UI is displayed, within an continuous viewing area again.

In the case in which a cursor (or a highlight) is positioned on a selection GUI on a CP content advertisement, and a cursor (or a highlight) returns to a broadcast program on an EPG UI while a CP content corresponding to the CP content advertisement is provided within a continuous viewing area, the processor 150 may also control the CP content advertisement to disappear from the EPG UI screen.

Meanwhile, although the exemplary embodiment described above is limited to the case in which a CP channel is provided between previous broadcast channels, various exemplary embodiments may be applied not only to a CP channel but may also be equally applied to other channels which are treated similarly to a CP channel or a content. For example, web content information based on URL information may be provided between previous broadcast channels.

Figure 3:
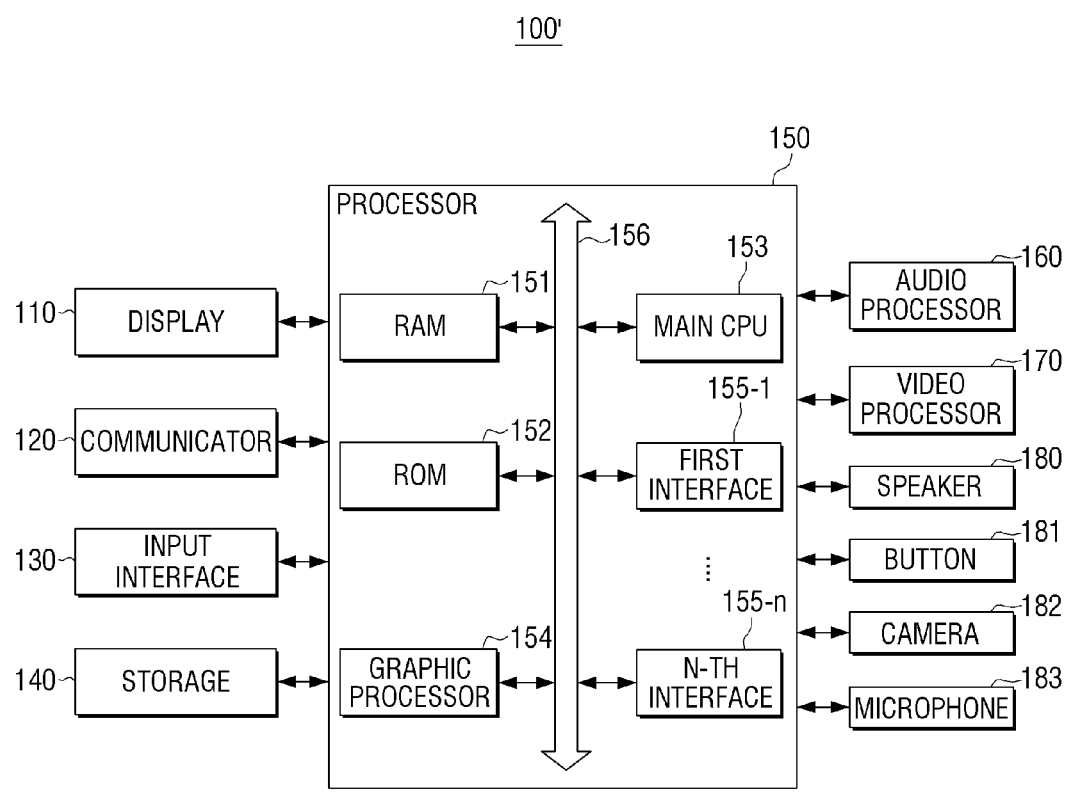
FIG. 3 is a block diagram illustrating a configuration of a broadcast receiving apparatus according to another exemplary embodiment.

FIG. 3 is a block diagram illustrating a detailed configuration of the broadcast receiving apparatus illustrated in FIG. 2.

According to FIG. 3, a broadcast receiving apparatus 100' includes a display 110, a communicator 120, an input interface 130, a storage 140, a processor 150, an audio processor 160, a video processor 170, a speaker 180, a button 181, a camera 182 and a microphone. The description for the elements of FIG. 3 which are overlapped with those of FIG. 2 will be omitted.

The storage 140 stores various modules for operating the broadcast receiving apparatus 100'. For instance, in the storage 140, a software including a base module, a sensing module, a communication module, a presentation module, a web browser module and a service module may be stored. The base module here is a base module which processes a signal transmitted from each hardware included in the broadcast receiving apparatus 100' and transfers the processed signal to an upper layer module. A sensing module collects information from various sensors, and analyzes and manages the collected information. A sensing module may include a face recognition module, a voice recognition module, a motion recognition module, a NFC recognition module, and the like. A presentation module is for configuring a display screen, and may include a multimedia module which plays and outputs a multimedia content and a UI rendering module which processes a UI and a graphic. A communication module is for communicating with an external source. A web browser module is for accessing to a web server by web browsing. A service module is a module which includes various applications to provide various services.

In particular, the storage 140 may include an EPG service module including an algorithm to provide an EPG UI service according to an exemplary embodiment. In this case, the processor 150 may provide various forms of EPG UIs described above using an EPG service module.

The processor 150 controls overall operation of the broadcast receiving apparatus 100' using various programs stored in the storage 140.

As an example, the processor 150 may execute an application stored in the storage 140 and configure the execution screen and display the screen, and may play various contents stored in the storage 140 as well. Further, the processor 150 may communicate with external devices through the communicator 120.

Specifically, the processor 150 includes a RAM 151, a ROM 152, a main CPU 153, a graphic processor 154, a first to n-th interfaces (155-1~155-n) and a bus 156.

The RAM 151, the ROM 152, the main CPU 153, the graphic processor 154, the first to n-th interfaces (155-1~155-n), etc. may be connected to one another through the bus 156.

The first to n-th interfaces (155-1~155-n) are connected to various elements described above. One of the interfaces may be a network interface which is connected to an external device through network.

The main CPU 153 accesses to the storage 140, and performs booting using O/S stored in the storage. Also, the main CPU 153 performs various operations using diverse programs, contents, data, etc. stored in the storage 140.

In the ROM 152, a command word set for booting a system is stored. When a turn-on command is inputted and power is supplied, the main CPU 153 copies O/S stored in the storage 140 to the RAM 151 according to a command word stored in the ROM 152, executes O/S, and boots a system. When booting is completed, the main CPU 153 copies various application programs stored in the storage 140 to the RAM 151, executes the application programs copied in the RAM 151, and performs various operations.

The graphic processor 154 generates a page including various objects such as an icon, an image, text, etc. using a computation unit (not illustrated) and a rendering unit (not illustrated). The computation unit (not illustrated) computes an attribute value such as a coordinate value, a shape, a size, a color, etc. in which each object is to be displayed according to a page layout based on a received control command. The rendering unit (not illustrated) generates pages having various layouts including an object based on the attribute value computed in the computation unit (not illustrated). The screen generated in the rendering unit (not illustrated) is displayed within a display area of the display 100.

The audio processor 160 processes audio data. The audio processor 160 may perform various functions such as decoding and amplifying audio data, noise filtering and the like.

The video processor 170 processes video data. The video processor 170 performs various image processing functions such as decoding video data, scaling, noise filtering, converting a frame rate, converting a resolution and the like.

The speaker 180 outputs not only various audio data processed in the audio processor 160 but also outputs various alarm sounds or a voice message. The camera 182 photographs a pause image or a video image according to a user control. The camera 182 may be implemented by a plurality of cameras such as a front camera, a rear camera and the like. The microphone 183 receives a user voice input or other sounds input and converts the sounds into audio data. The processor 150 may use a user voice which has been inputted through the microphone 183 during a call, or convert a user sound into audio data and store the converted audio data in the storage 140. If there have been provided the camera 182 and the microphone 183, the processor 150 may also perform various control operations such as a channel zapping operation according to a user voice inputted by the microphone 184 or a user motion recognized by the camera 183. In addition, diverse external input ports such as a headset, a mouse, a LAN, etc. may be included to connect with various external terminals.

Meanwhile, FIG. 3 illustrates an exemplary embodiment of details of the broadcast receiving apparatus 100'. According to an exemplary embodiment, some of the elements illustrated in FIG. 2 may be omitted or modified, and a new element may be further included.

Figure 4:
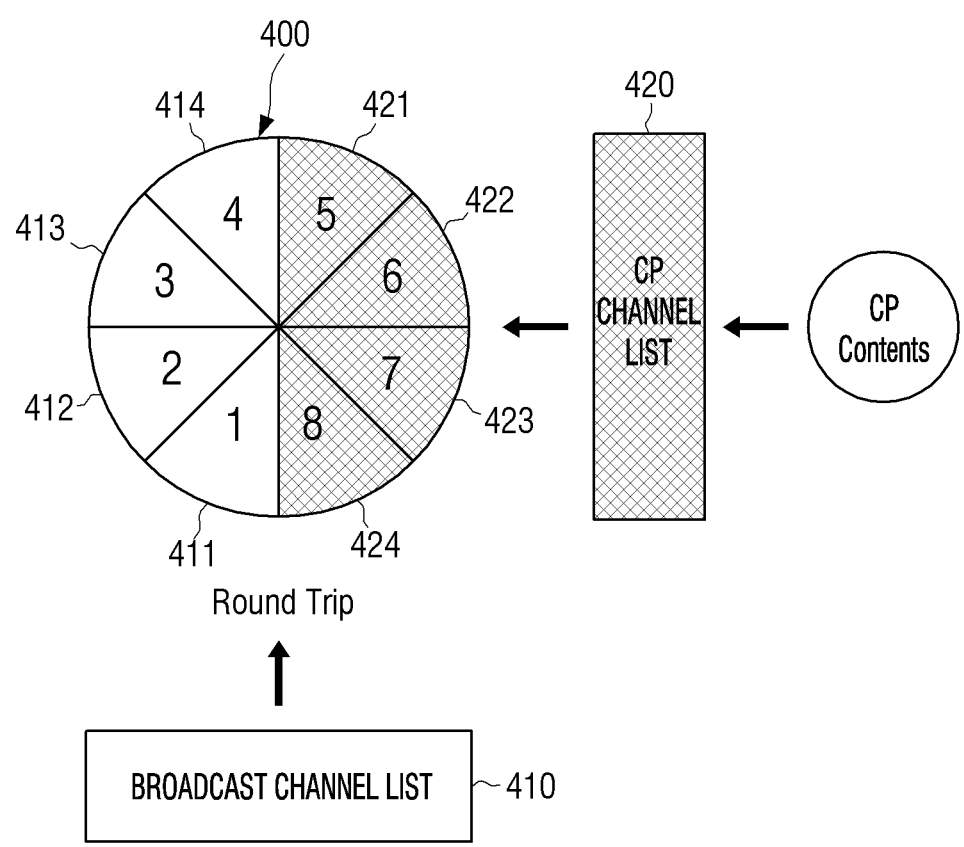
FIG. 4 is a diagram for describing a channel structure according to an exemplary embodiment.

FIG. 4 is a diagram for describing a channel structure according to an exemplary embodiment.

As illustrated in FIG. 4, the channel structure 400 according to an exemplary embodiment may include a previous broadcast channel list 410 and a CP channel list 420. Here, the broadcast channel list may include channels provided by a broadcast channel provider (PP) including a terrestrial wave and a data broadcast channel provider (DP), and the CP channel list 420 may include channels provided by a content provider.

As illustrated, the broadcast channel list 410 and the CP channel list 420 may be assigned such that the channels may not be overlapped with other channel numbers, and both the channel lists have an equal channel relation. However, the CP channel may be assigned to channel numbers (421 to 424) which are subsequent to channel numbers (411 to 414) to which previous broadcast channels are assigned. Therefore, in the case in which the number of channels increase, a user rarely browses an EPG UI existing on the rear end of a previous channel, and a user rarely browses a CP channel accordingly. However, according to the exemplary embodiment, if information about a CP content channel or a CP content is provided in some area of an EPG UI according to an exemplary embodiment, a CP channel recommendation effect or a CP channel advertisement effect may be provided as well.

Figure 5:
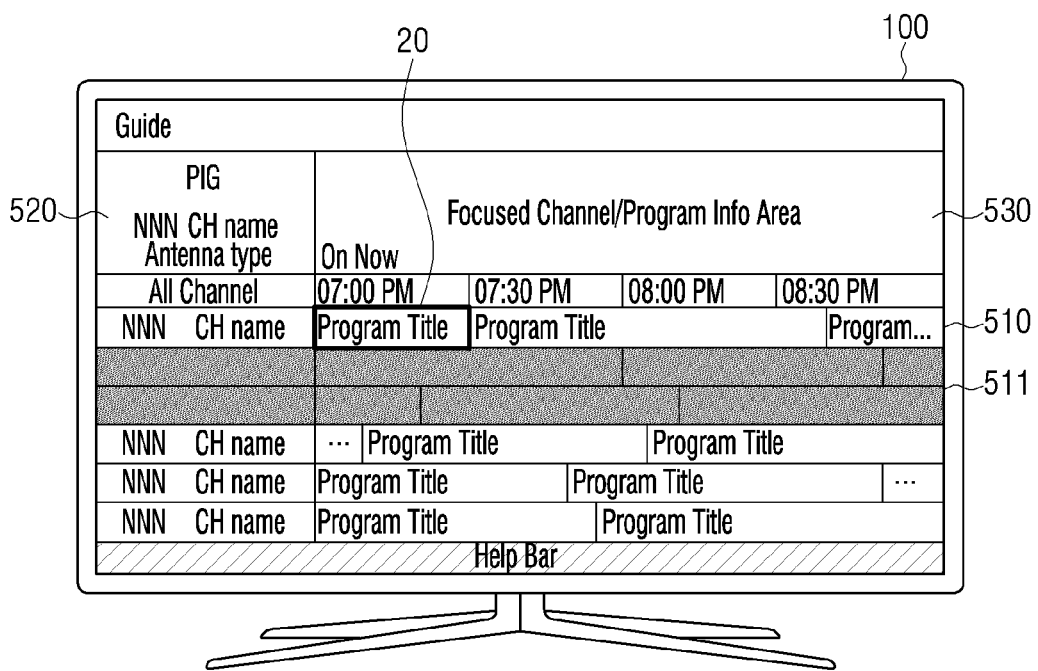
FIG. 5 is a diagram for describing an EPG UI according to an exemplary embodiment.

FIG. 5 is a diagram for illustrating an EPG UI according to an exemplary embodiment.

As illustrated in FIG. 5, an EPG UI according to an exemplary embodiment may include a first area 510 which provides a program schedule, a second area 520 which displays a currently selected content and a third area 530 which includes currently selected content information.

The first area 510 providing a program schedule may provide a channel number, a channel name and program information respective for each channel, and in particular, an area for advertising or recommending a CP content (511) may be provided in the first area 510.

The second area 520 displaying a currently selected content may continuously provide a content that a user have viewed right before an EPG UI is displayed on a part of the EPG UI area, and thereby maintaining a broadcast experience of a user. Also, a preview of a program selected on an EPG UI may be provided in the second area 520. According to an exemplary embodiment, a CP content corresponding to a content advertisement may be provided in the second area 520.

The third area 530 providing information about a currently selected content provides detailed information about a content provided in the second area 520. For instance, channel information and program information provided in the second area 520 may be provided in the third area 530.

Meanwhile, a selection GUI 20 for selecting a content may be provided on an EPG UI by a content unit. For instance, the selection GUI 20 may be implemented by a highlight or a cursor.

Figure 6A:
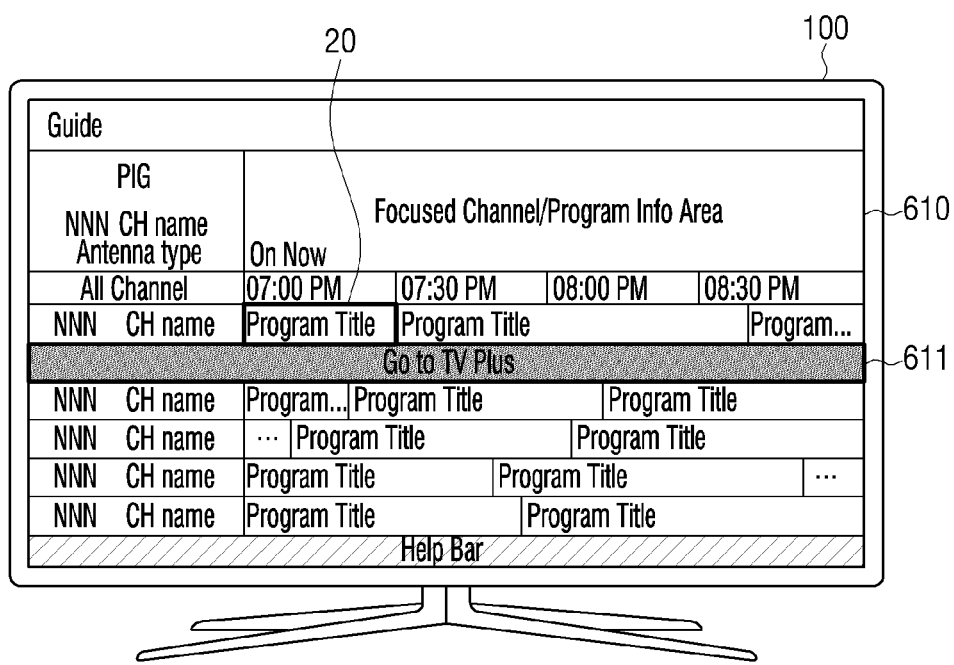
FIGS. 6A, 6B, 7 and 8 are diagrams for describing a method of CP content advertisement on an EPG UI according to various exemplary embodiments.
Figure 6B:
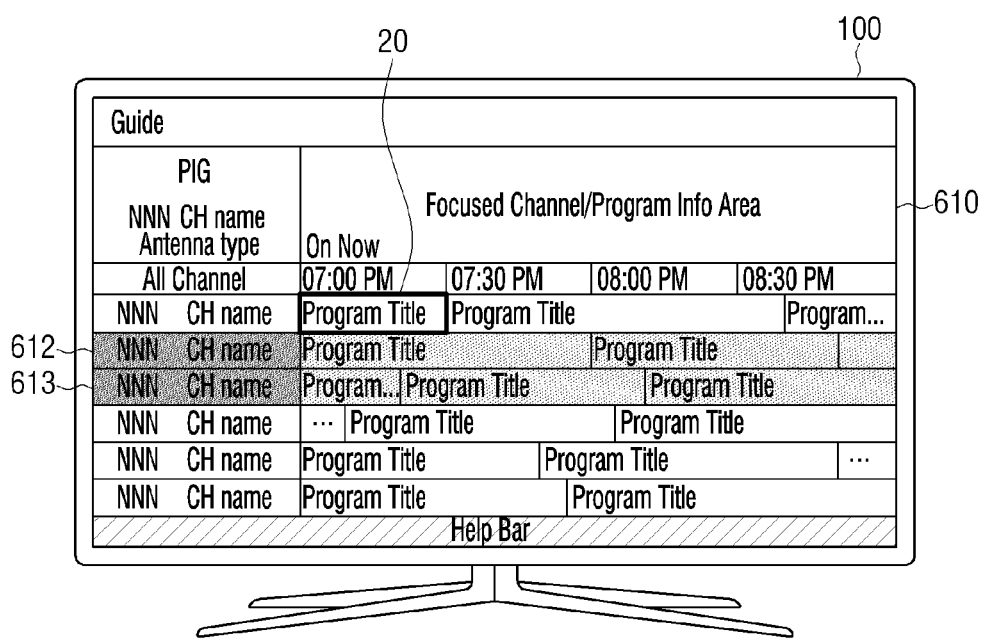

FIGS. 6A and 6B are diagrams for describing a method of a CP content advertisement in an EPG UI according to an exemplary embodiment.

As illustrated in 6A, on an EPG UI 610, information (611) about a group in which a plurality of content advertisements are grouped may be provided in the same form as the form of another broadcast channel. For example, a plurality of CP channels provided by a content provider A may be grouped and be provided in a form of one channel. Of course, a plurality of CP channels provided by each different content provider may also be grouped and provided in a form of one channel.

Or, as illustrated in 6B, on an EPG UI 610, each of a plurality of content advertisements may be provided in a form of a separate channel (612 and 613). In this case, each content information may be exposed and provided. For example, CP content information provided by each CP channel information and each CP channel may be exposed and provided.

Figure 7:
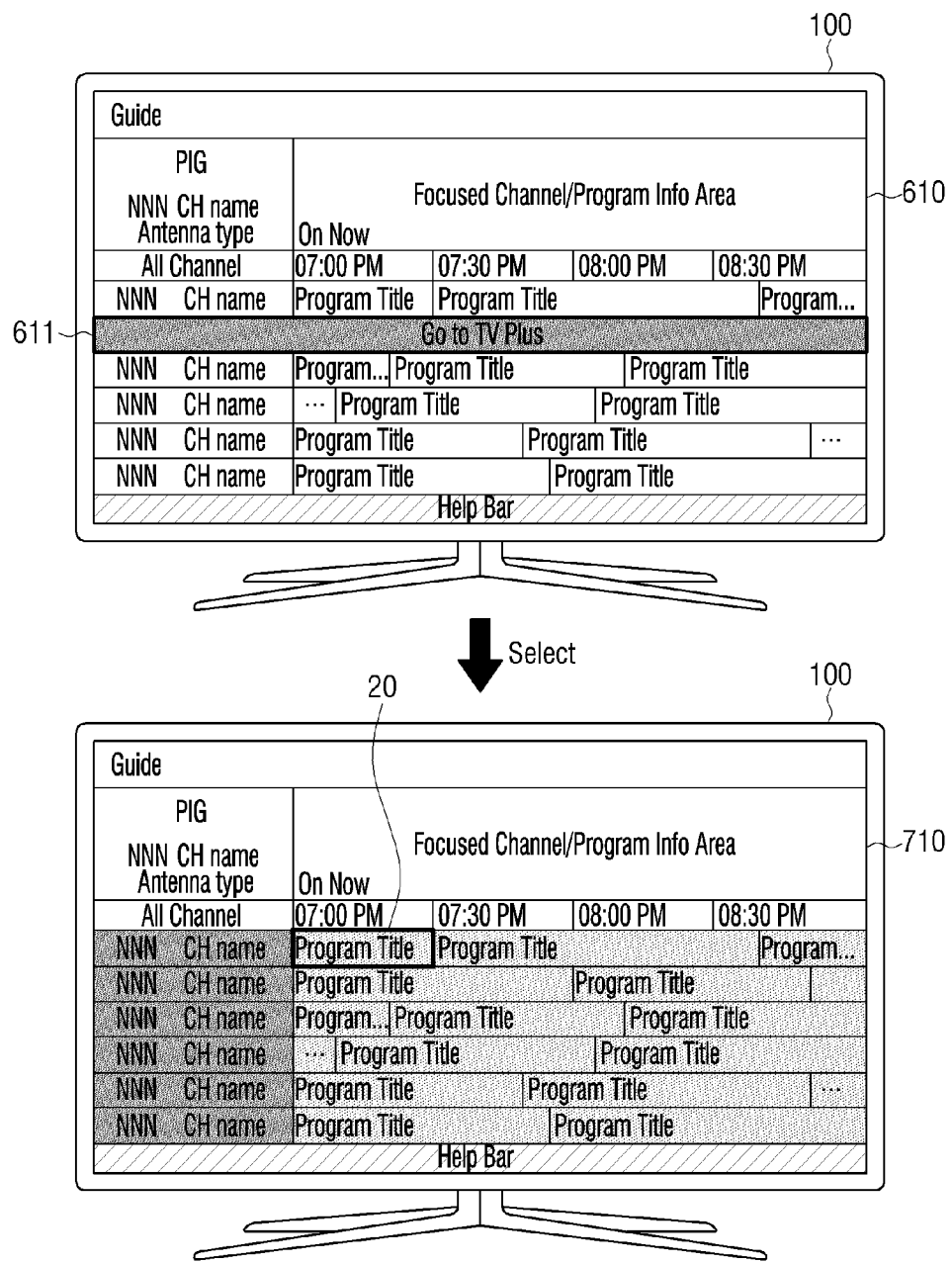

FIG. 7 illustrates an exemplary embodiment of the case in FIG. 6, the case in which content group information 611 is selected.

According to FIG. 7, when content group information 611 is selected in an EPG UI 610, a content list 710 which can browse a plurality of content advertisements within a content group may be provided. Here, the content list 710 may be, for example, an EPG UI page in which a CP channel corresponding to a plurality of content advertisements within a respective content group is actually mapped within the EPG UI.

Figure 8:
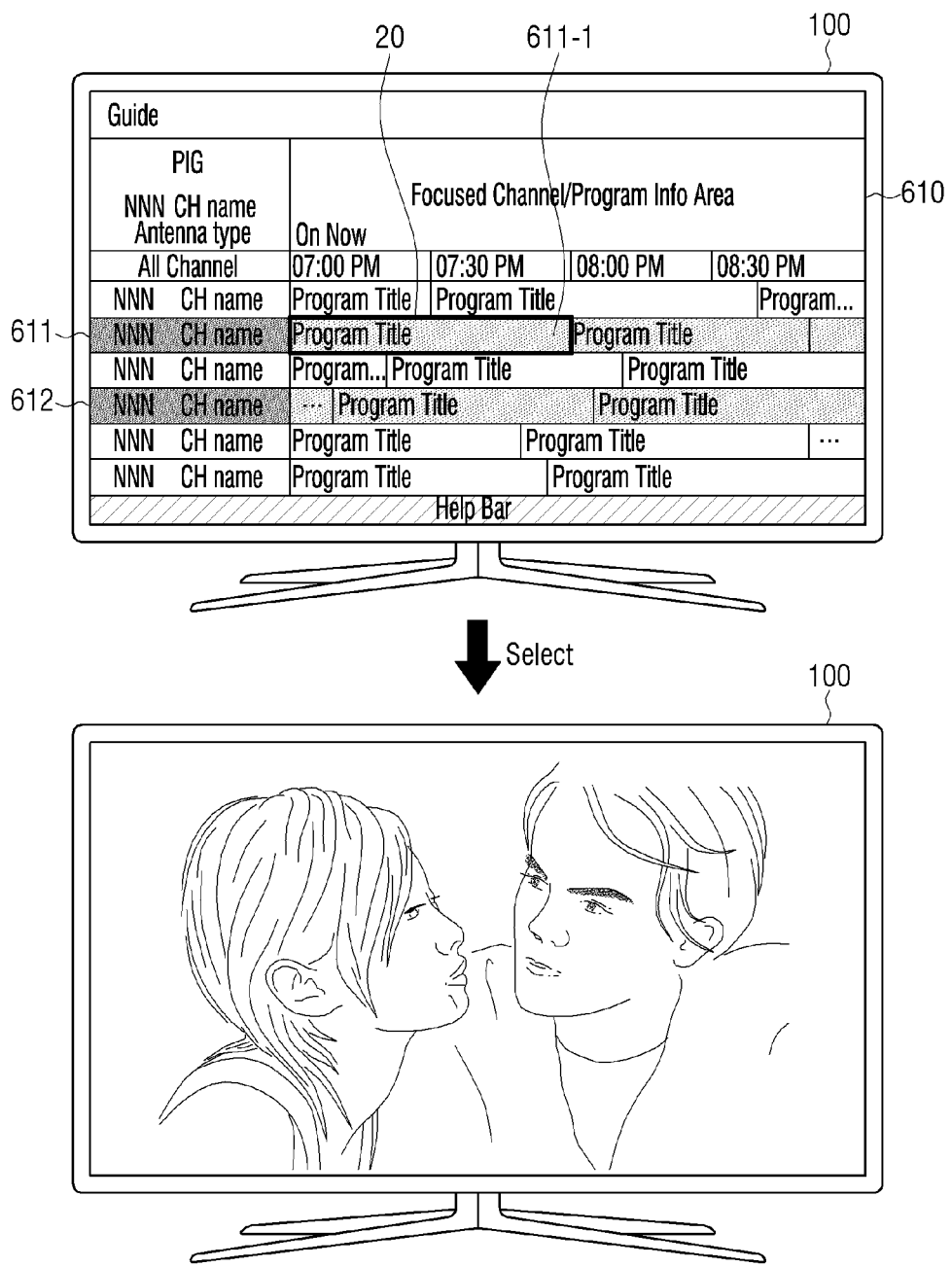

FIG. 8 illustrates an exemplary embodiment of the case in FIG. 6B, the case in which a content (611-1) of a certain CP channel is selected.

According to FIG. 8, in the case in which a content (611-1) of a certain CP channel is selected in the EPG UI 610, a screen providing the selected content may be displayed. For example, if a select button is inputted while a cursor or a highlight 20 is positioned on a certain CP channel content 611-1, a page is converted into a page displaying a respective content.

Figure 9A:
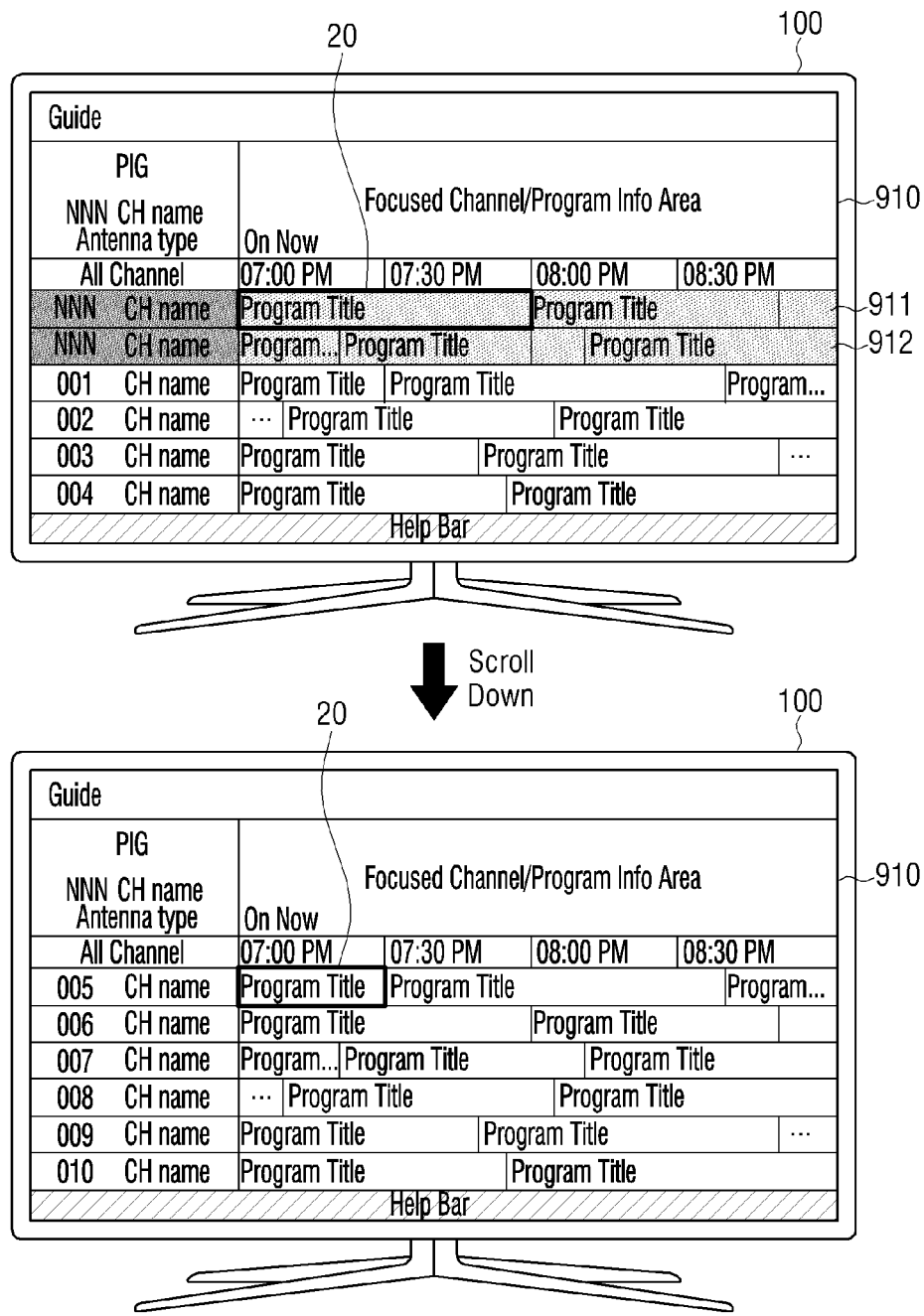
FIGS. 9A-13B are diagrams for describing a method for providing an EPG UI according to various exemplary embodiments.
Figure 9B:
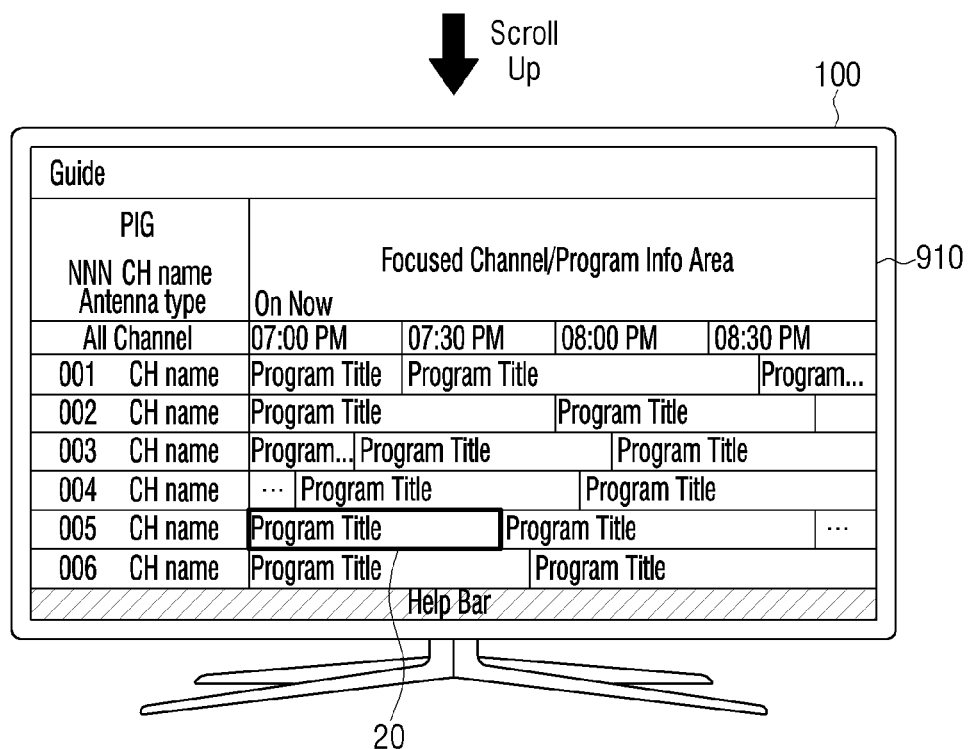

FIGS. 9A to 13B are diagrams for describing a method for providing an EPG UI according to various exemplary embodiments. in the case in which, According to an exemplary embodiment, as illustrated in FIG. 9A, while a screen 910 including a first page of an EPG UI which includes a CP content advertisement (911 and 912) is displayed, after converting into a next page according to a user browsing commend (e.g., a scroll-down manipulation), and if a page returns to an original page according to a user browsing command (e.g., a scroll-up manipulation) as illustrated in FIG. 9B, the content advertisement displayed in a form of a channel may disappear from the EPG UI screen 910.

Figure 10A:
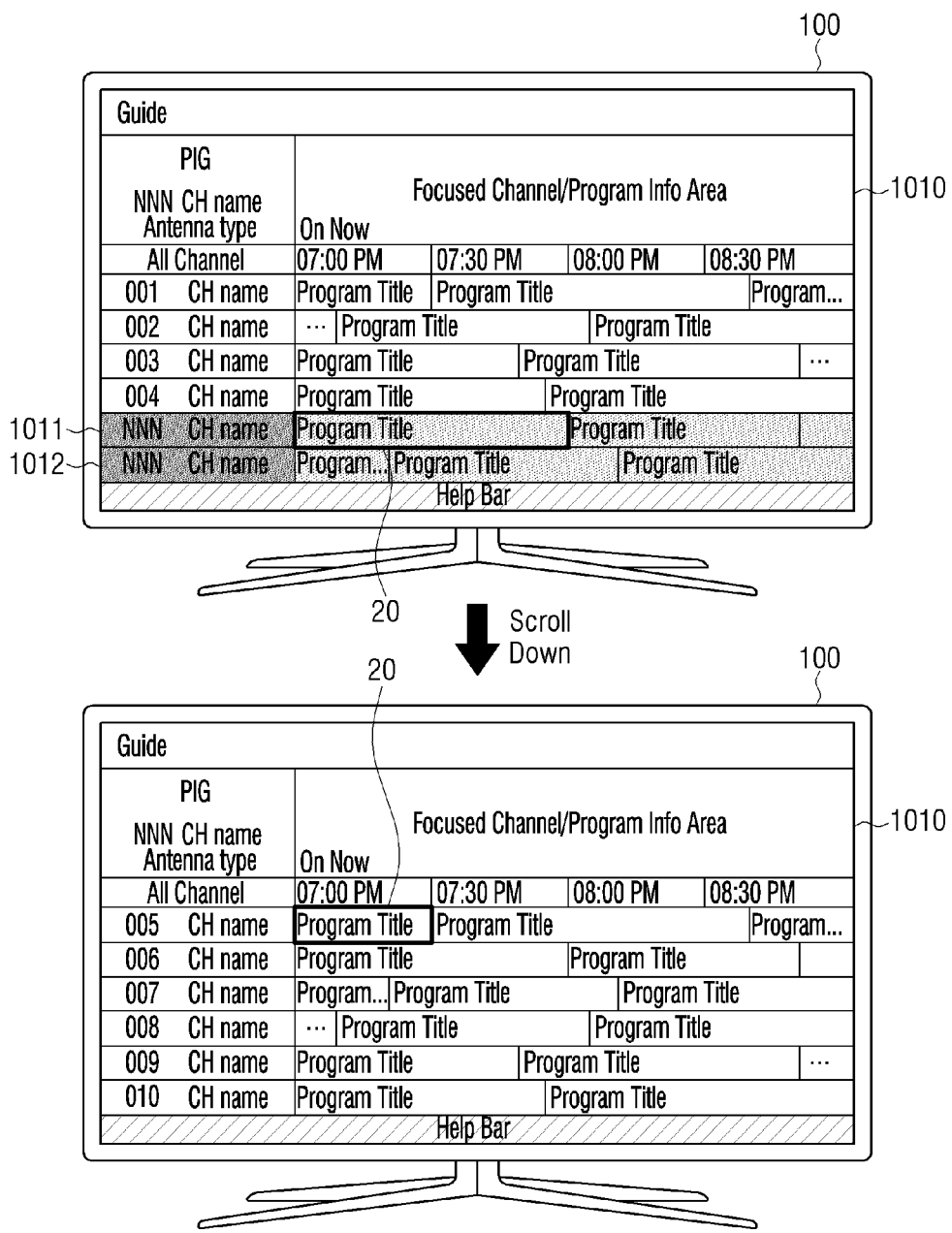
Figure 10B:
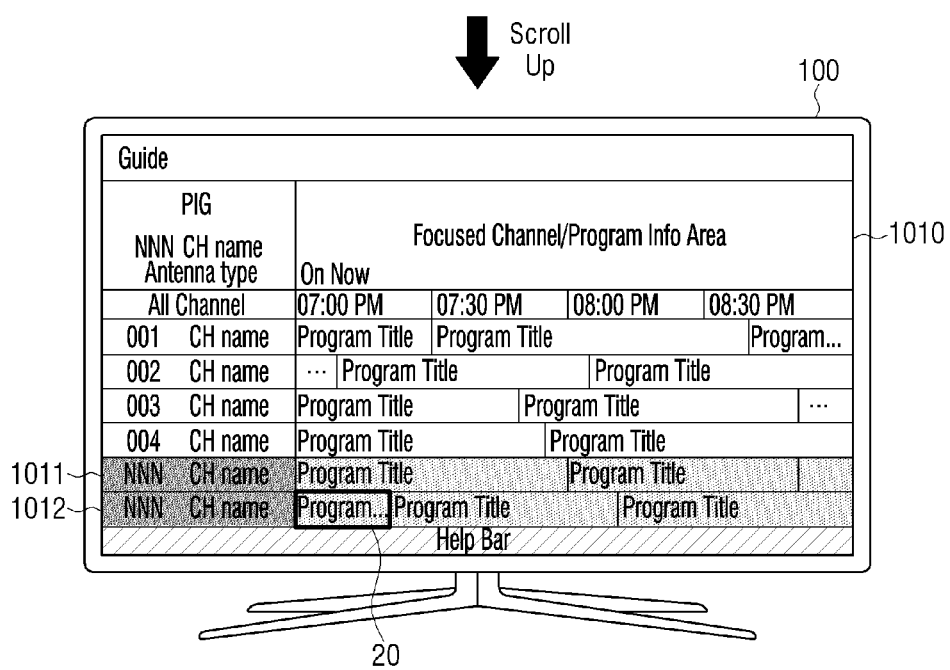

According to another exemplary embodiment, as illustrated in FIG. 10A, while an EPG UI screen 1010 including a CP content advertisement 1011 and 1012 are displayed, after converting into a next page according to a user browsing command, and if a page returns to an original page as illustrated in FIG. 10B, the CP content advertisement 1011 displayed in a form of a channel is maintained as it is and provided on the EPG UI screen 1010.

Figure 11A:
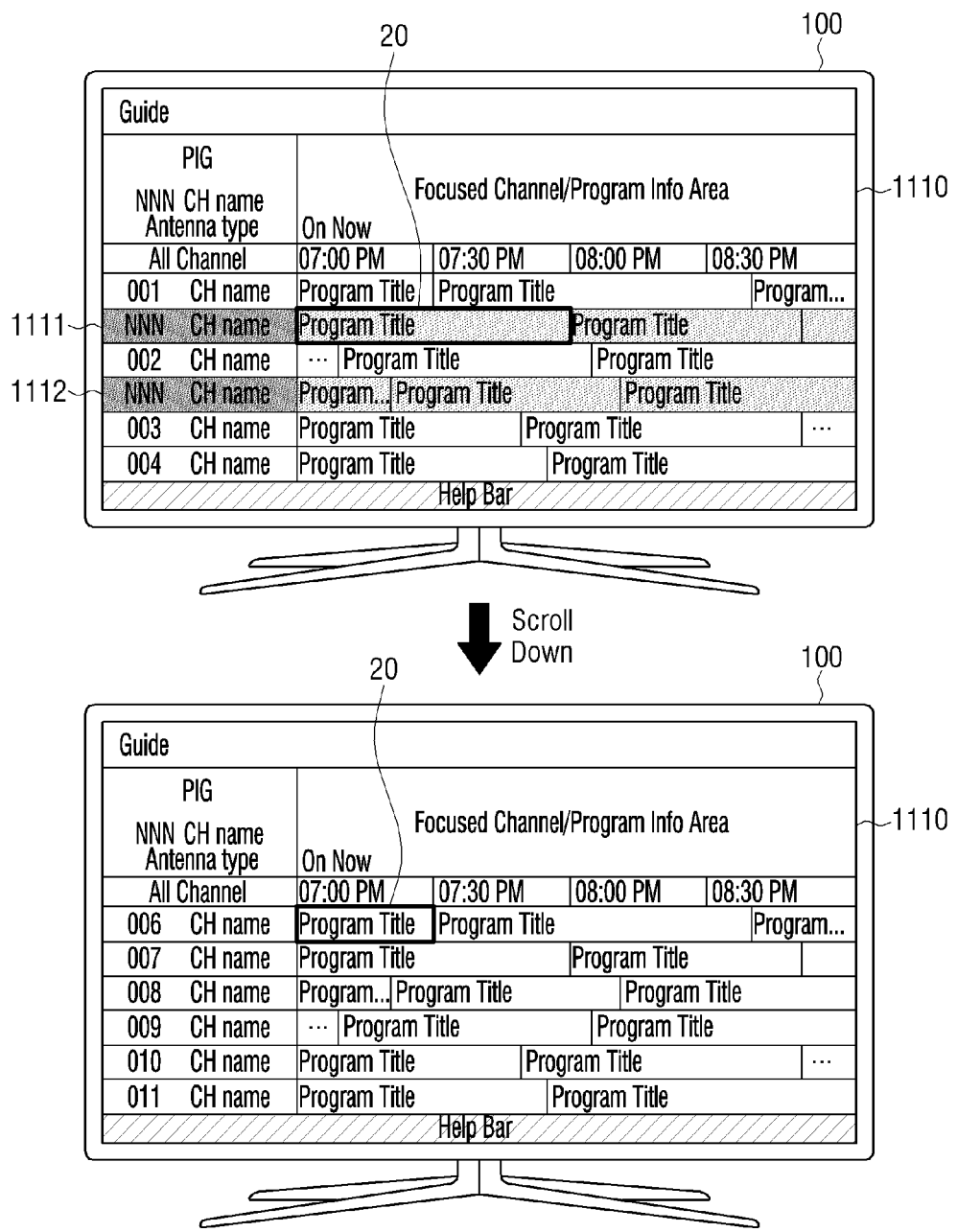
Figure 11B:
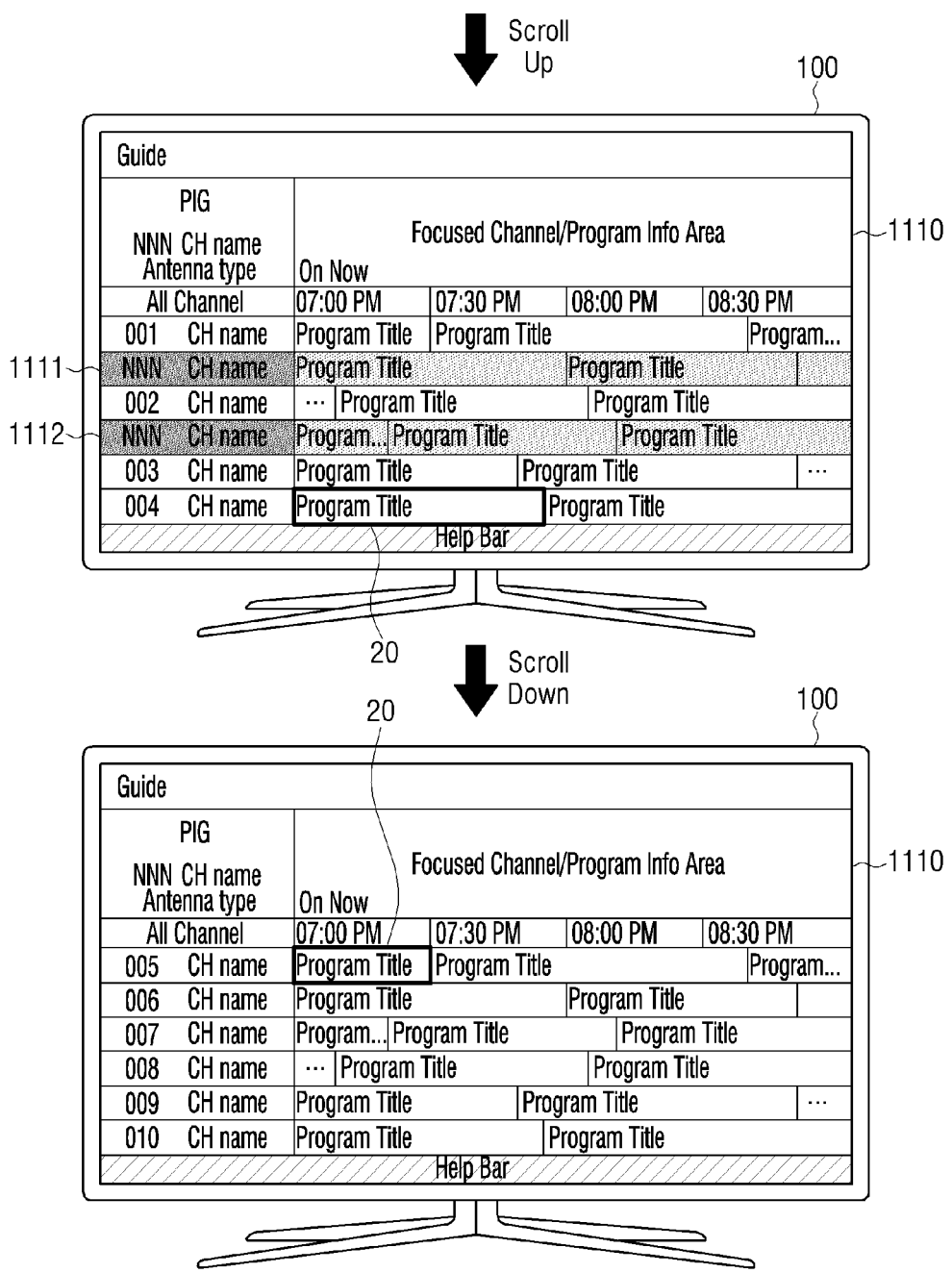
Figure 11C:
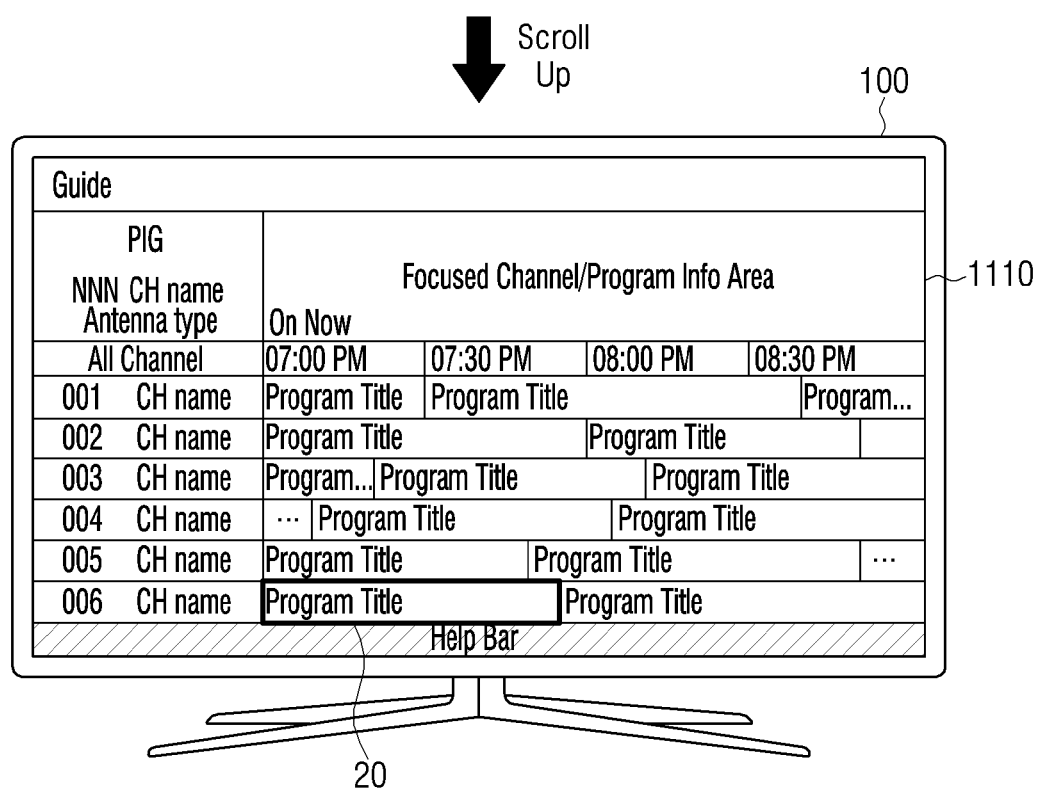

According to another exemplary embodiment, as illustrated in FIG. 11A, while an EPG UI screen 1110 including a CP content advertisement 1111 and 1112 are displayed, after converting into a next page according to a user browsing command, and if a page returns to an original page as illustrated in FIG. 11B, the CP content advertisement 1111 displayed in a form of a channel may be maintained on the EPG UI screen 1110 as it is. However, after repeatedly converting into a next page, if a page returns to an original page, the CP content advertisement displayed in a form of a channel may disappear from the EPG UI screen 1110 as illustrated in FIG. 11C. That is, if the number of returning from the EPG UI screen 1110 to a respective page is more than a preset number, a CP content advertisement may disappear.

Figure 12A:
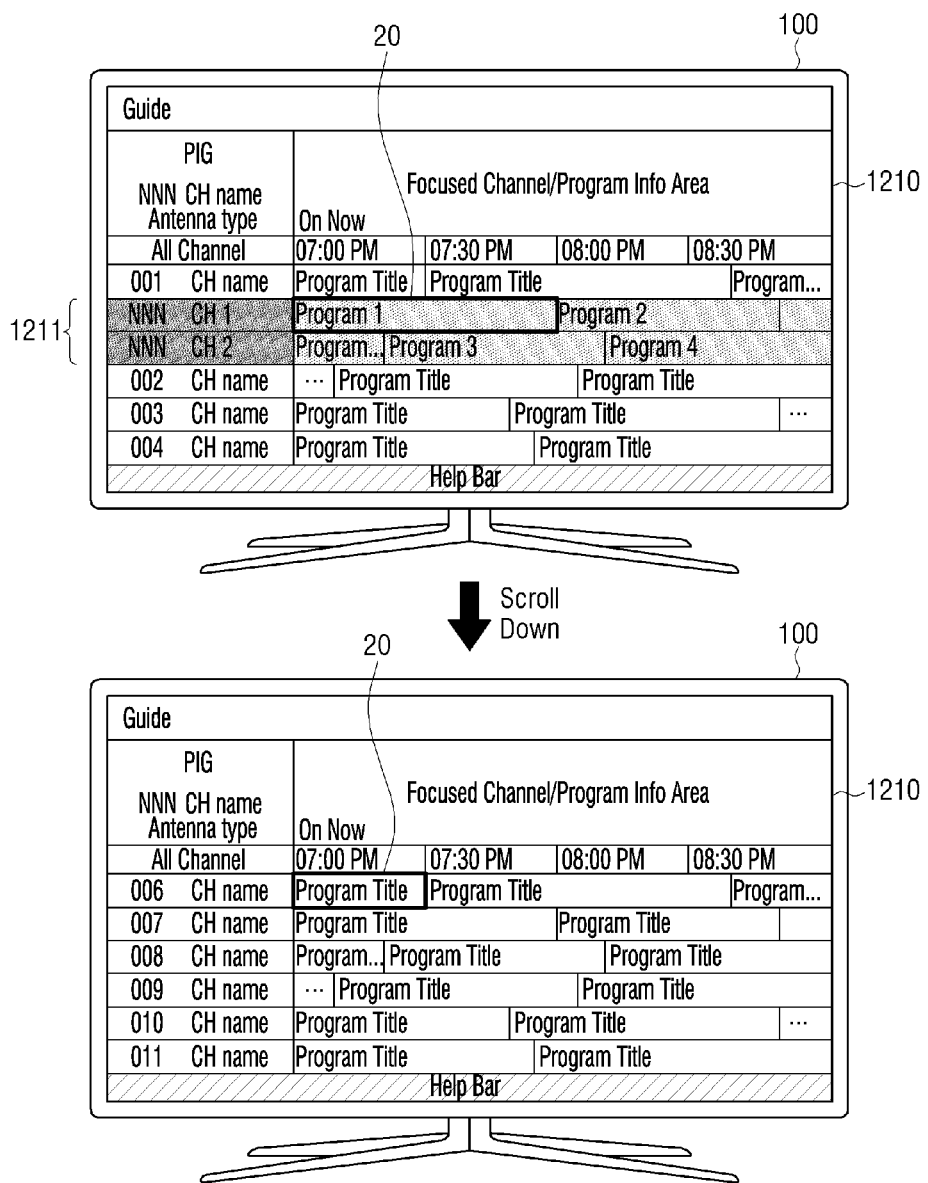
Figure 12B:
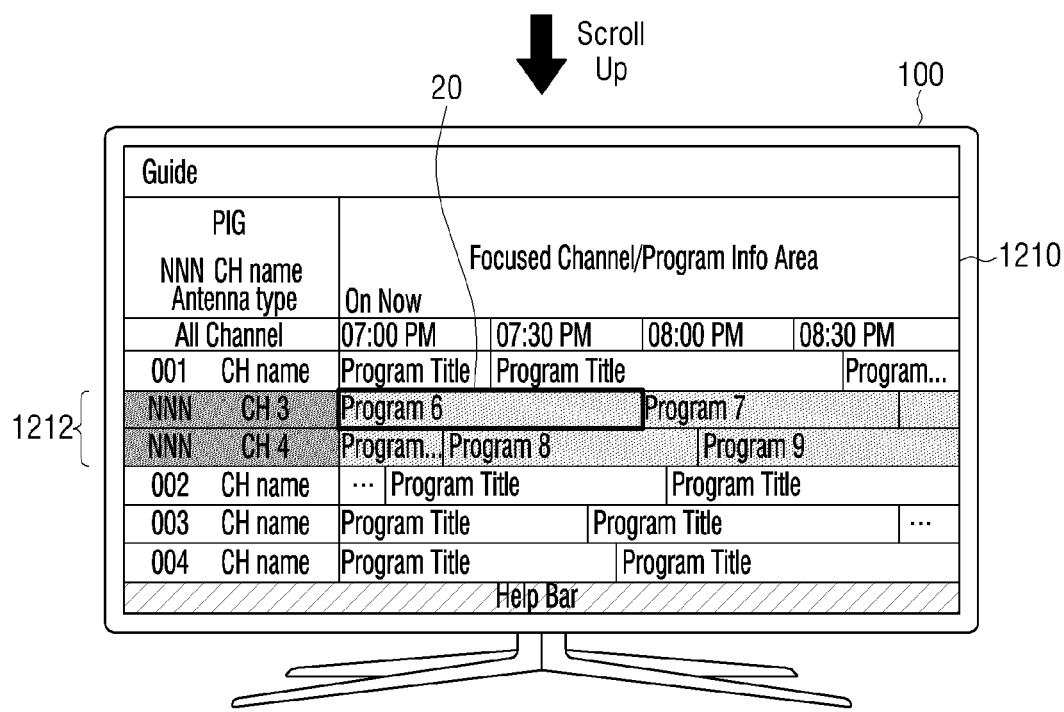

According to another exemplary embodiment, as illustrated in FIG. 12A, while an EPG UI screen 1210 including a CP content advertisement 1211 is displayed, after converting into a next page according to a user browsing command, and if a page returns to an original page as illustrated in FIG. 12B, a CP content advertisement 1212, which is different from an initially provided CP content advertisement 1211, may be provided.

Figure 13A:
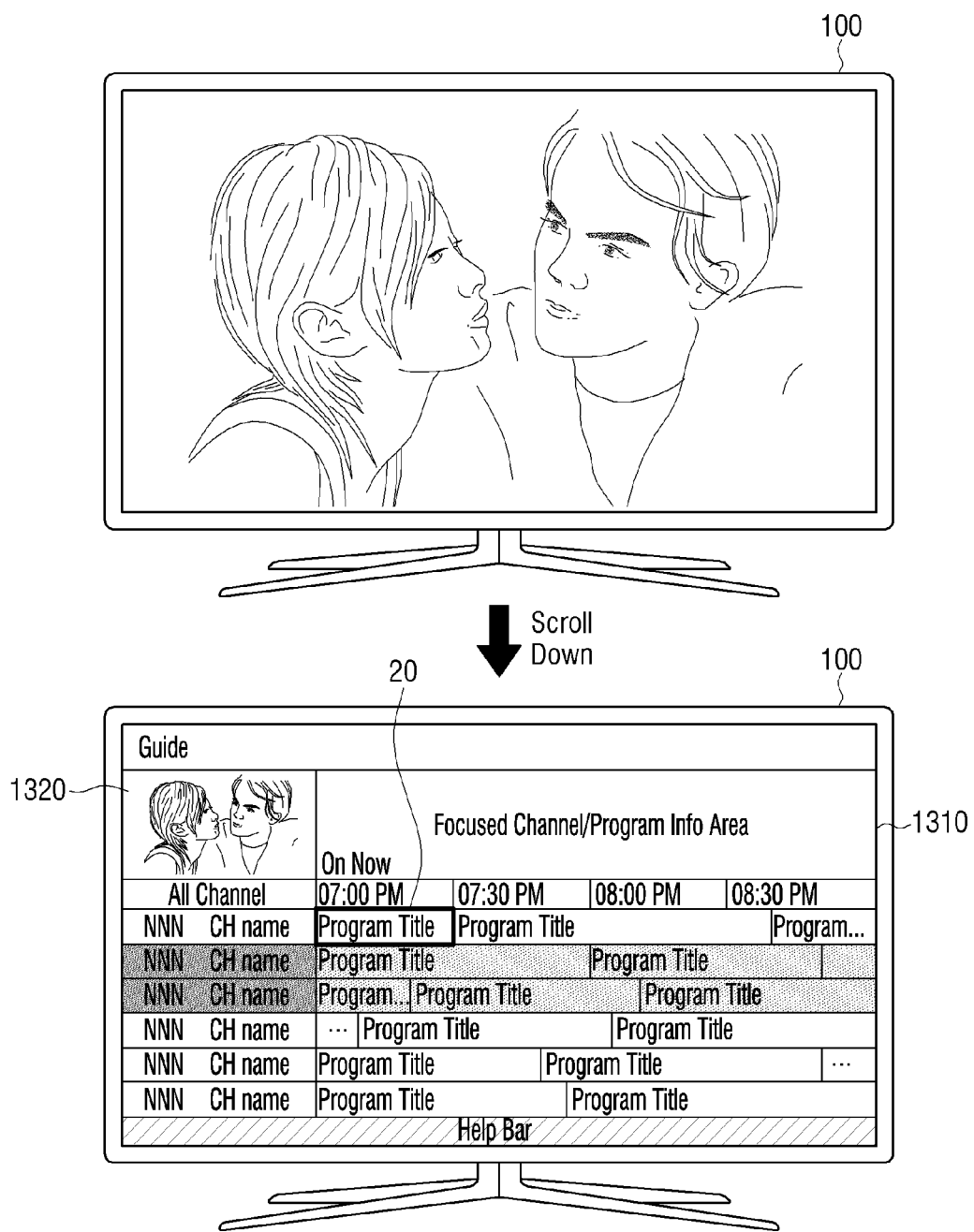
Figure 13B:
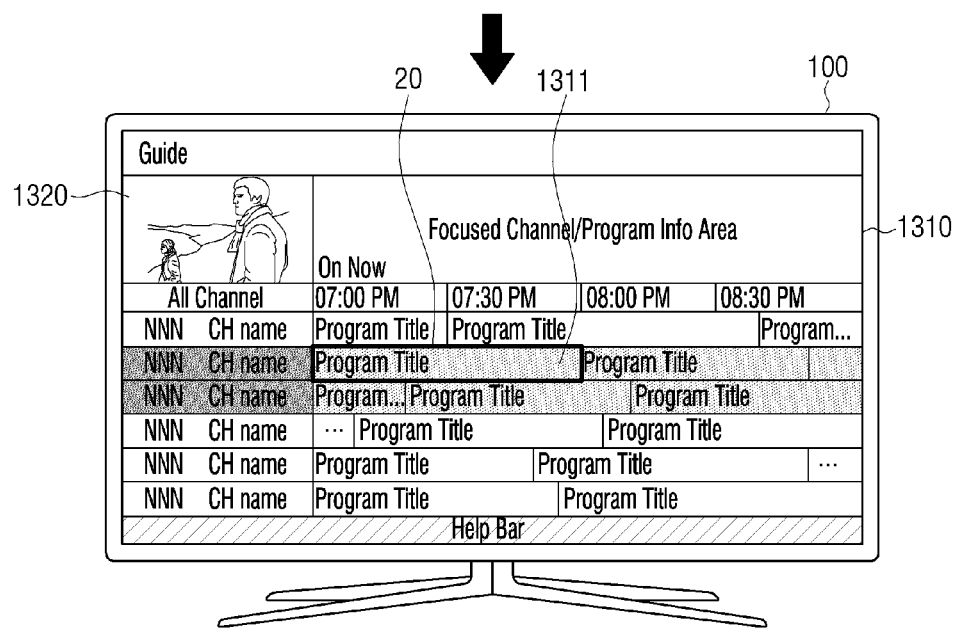

According to another exemplary embodiment, as illustrated in FIG. 13A, while a broadcast content is provided on a screen, and if an EPG UI screen 1310 is provided according to a preset event, a content which have been provided right before the EPG UI is displayed may be continuously provided on a continuous viewing area 1320 of the EPG UI screen. However, as illustrated in 13B, if the selection GUI 20 is positioned on CP content information 1311 provided as an advertisement, a CP content corresponding to the CP content information may be provided on a respective continuous viewing area. Here, a CP content provided on the continuous viewing area may be a form in which a respective CP content is played, but also be a form in which a thumbnail of the respective CP content is provided.

Meanwhile, it is described that a CP channel is provided between previous broadcast channels, but various examples may be applied not only to a CP channel but also be equally applied to other channels or contents, etc. which are treated similarly to a CP channel. For example, a web content based on URL information may also be provided between previous broadcast channels.

Figure 14:
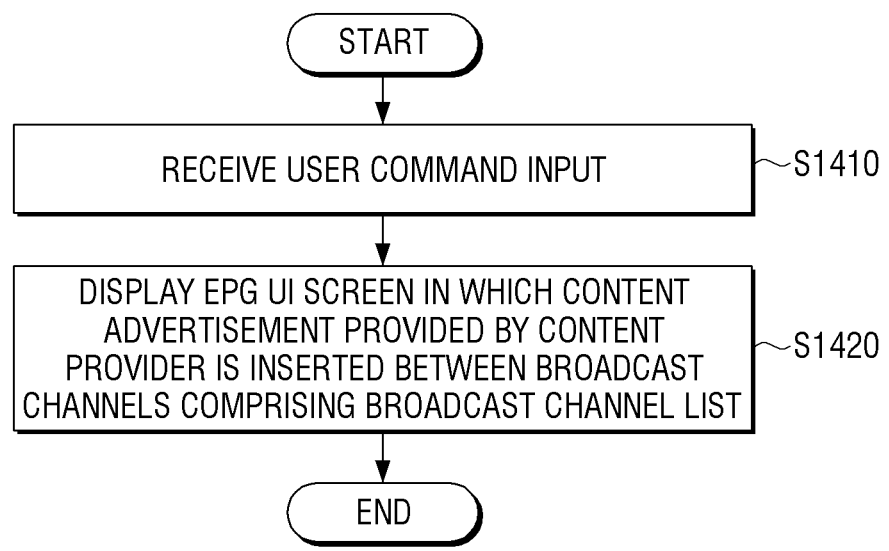
FIG. 14 is a flow chart for describing a control method of a broadcast receiving apparatus according to an exemplary embodiment.

FIG. 14 is a flow chart for describing a control method of a broadcast receiving apparatus according to an exemplary embodiment. The control method of the broadcast receiving apparatus according to an exemplary embodiment illustrated in FIG. 14 is, when a user command for displaying an EPG UI including a broadcast channel list is input, in operation S1410, inserting a content advertisement provided by a content provider between broadcast channels included in a first page of an EPG UI and displaying the content advertisement, in operation S1420.

In S1420 operation in which an EPG UI page is displayed, information about a content advertisement group in which a plurality of content advertisements are grouped may be provided as a content advertisement on an EPG UI.

The control method of the broadcast receiving apparatus may further include, in response to information about a content group being selected according to a user browsing command on an EPG UI, providing a content list by which a user browse a plurality of contents within a content group.

The control method of the broadcast receiving apparatus may further include, after a page conversion according to a user browsing command on an EPG UI, in response to returning to a first page, controlling a displayed content advertisement inserted between broadcast channels to disappear.

The control method of the broadcast receiving apparatus may further include, after a page conversion according to a user browsing command on an EPG UI, in response to returning to a first page, maintaining a content advertisement inserted between broadcast channels and displayed and providing the content advertisement.

The control method of the broadcast receiving apparatus may further include, after a page conversion according to a user browsing command on an EPG UI, in response to returning to a first page, providing a content advertisement which is different from a content advertisement initially provided.

The control method of the broadcast receiving apparatus may store a broadcast channel list and a CP channel list in which at least one of CP channels provided by a content provider is sequentially arranged. In this case, in the S1410 stage in which an EPG UI page is displayed, an EPG UI may be provided by inserting at least one of CP channels comprising a CP channel list between two broadcast channels which comprises a broadcast channel list.

The EPG UI page may include an area providing a continuous viewing function for a content that has been displayed before the EPG UI is displayed.

In the above case, the control method of the broadcast receiving apparatus may further include, in response to a content advertisement being selected, provides a content corresponding to the content advertisement selected in the continuous viewing area.

The control method of the broadcast receiving apparatus may further include, in response to a selection GUI being positioned on the content advertisement, providing a content corresponding to the content advertisement in the continuous viewing area.

Figure 15:
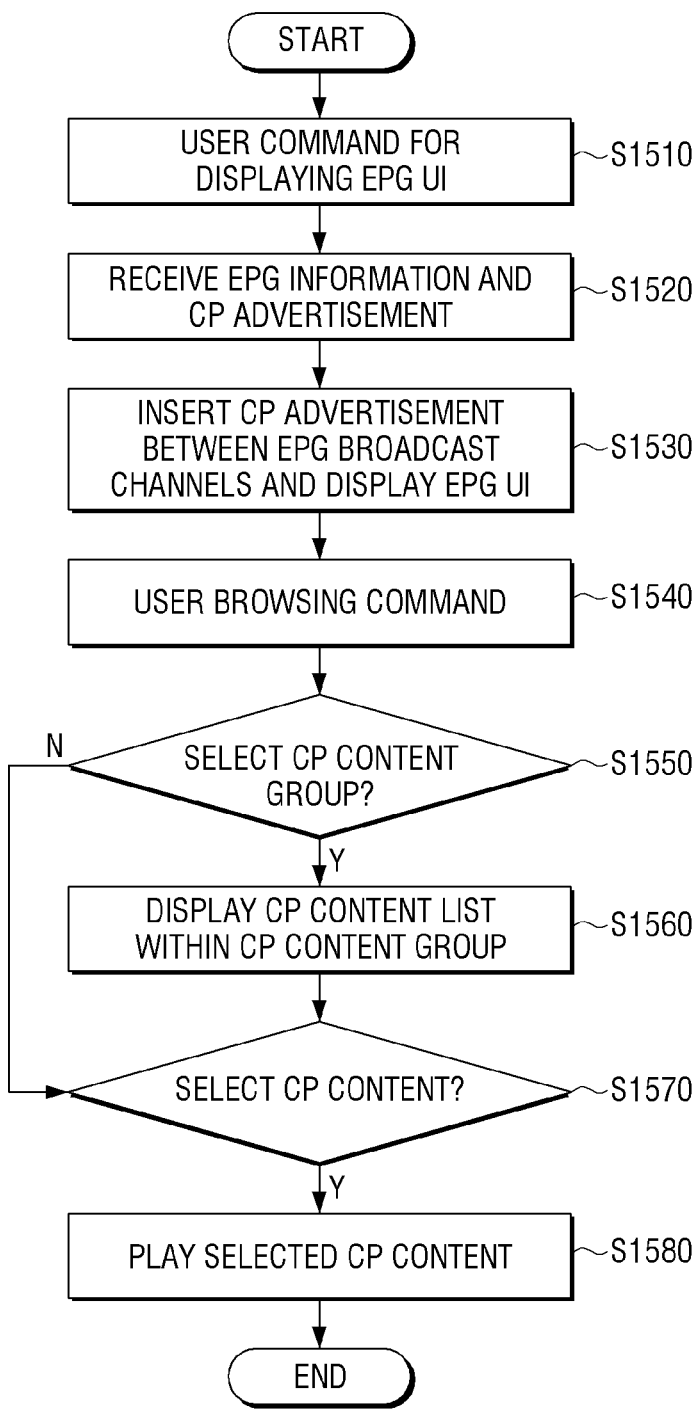
FIG. 15 is a flow chart for describing a method for providing an EPG UI according to an exemplary embodiment.

FIG. 15 is a flow chart for describing a method for providing an EPG UI according to an exemplary embodiment.

Referring to the method for providing an EPG UI according to an exemplary embodiment illustrated in FIG. 15 is, in response to a user command for displaying an EPG UI being input in operation S1510, requesting EPG information and a CP advertisement provided by a content provider to a server 200 and receiving EPG information and a CP advertisement in operation S1520 from the server 200.

And then, a CP advertisement is inserted between EPG broadcast channels and an EPG UI is displayed in operation S1530.

After that, according to a user browsing command on an EPG UI in operation S1540, in response to a CP content group being selected in operation S1550:Y, a CP content list is displayed within a CP content group in operation S1560. In this case, a page in which a respective CP content (e.g., a CP channel) is actually mapped may be provided as a CP content list within an EPG UI.

And then, in response to a CP content being selected on a CP content list in operation S1570, a selected CP content is played in operation S1580. Meanwhile, according to a user browsing command S1540, if a CP content is selected right way in operation S1560, the selected CP content is displayed in operation S1580.

According to various exemplary embodiments as described so far, a respective content information may be naturally exposed by assigning an advertisement area for a certain content on an EPG UI, therefore, a content provider's convenience and a user' convenience may be improved.

The control method of a broadcast receiving apparatus according to various exemplary embodiments described above may be implemented as a program and provided to the broadcast receiving apparatus.

As an example, when a user command is inputted for displaying an Electronic Program Guide (EPG) UI including a broadcast channel list, a non-transitory computer readable medium where a program which inserts a content advertisement provided by a content provider between broadcast channels included in a first page of an EPG UI and provides the content advertisement is stored may be provided.

A non-transitory computer readable medium is a medium which does not store data during a short-term such as a register, a cache, a memory and the like, but semi-permanently stores data, and can perform a reading through a device. Specifically, the various applications and programs described above may be stored in and provided through a non-temporary reading device such as a CD, a DVD, a hard disk, Blu-Ray, a disk, an USB, a memory card, a ROM and the like, or may be downloaded through a network such as an internet.

The foregoing exemplary embodiments and advantages are merely exemplary and are not to be construed as limiting the present disclosure. The present description can be readily applied to other types of apparatuses. Also, the description of the exemplary embodiments is intended to be illustrative, and not to limit the scope of the claims, and many alternatives, modifications, and variations will be apparent to those skilled in the art and are within the scope of the inventive concept. Therefore, the scope of an inventive concept is not limited to the described exemplary embodiments and may be determined by claims and their equivalents.

What is claimed is:

1. A broadcast receiving apparatus comprising:
a display;
and
a processor configured to control the display to display an Electronic Program Guide (EPG) user interface (UI) on a page-by-page basis,
wherein a page of the EPG UI comprises a list comprising broadcast channels and a content advertisement for a content provider (CP) channel where content is provided by a content provider, the content advertisement being inserted between the broadcast channels, and
wherein, in response to returning to the page of the EPG UI after a page conversion according to a user browsing command, the processor controls the content advertisement to disappear from the page of the EPG UI.

2. The broadcast receiving apparatus of claim 1, wherein the processor is further configured to insert into the EPG UI the content advertisement having a form in which a plurality of CP channels provided by the content provider are grouped together, and to provide the content advertisement.

3. The broadcast receiving apparatus of claim 2, wherein in response to a selection of information about the channel group on the EPG UI, the processor is further configured to provide a new channel list for browsing the plurality of CP channels within a channel group.

4. The broadcast receiving apparatus of claim 1, further comprising a memory to store a CP channel list which comprises CP channels being sequentially arranged.

5. A broadcast receiving apparatus comprising:
a display; and
a processor configured to control the display to display an Electronic Program Guide (EPG) user interface (UI) on a page-by-page basis,
wherein a page of the EPG UI comprises a list comprising broadcast channels and a content advertisement for a content provider (CP) channel where content is provided by a content provider, the content advertisement being inserted between the broadcast channels, and
wherein, in response to returning to the page of the EPG UI after a page conversion according to a user browsing command, the processor provides a content advertisement which is different from the content advertisement initially provided.

6. The broadcast receiving apparatus of claim 1, wherein the processor is further configured to control the display to display an area providing a continuous viewing function for viewing a content that has been displayed before the EPG UI is displayed, and wherein, in response to the content advertisement being selected, the processor is further configured to provide, in the continuous viewing area, a content corresponding to the selected content advertisement.

7. The broadcast receiving apparatus of claim 1, wherein the display displays an area providing a continuous viewing function for viewing a content that has been displayed before the EPG UI is displayed, and wherein, in response to a selection GUI being positioned on the content advertisement, the processor is further configured to control the display to display, in the continuous viewing area, a content corresponding to the content advertisement.

8. The broadcast receiving apparatus of claim 7, wherein in response to the selection GUI returning to the broadcast channel on the EPG UI, the processor is further configured to control the display to provide a continuous viewing function for viewing the content that has been provided before the EPG UI is displayed within the continuous viewing area.

9. A control method of the broadcast receiving apparatus, the control method comprising:
receiving a user input; and
displaying an Electronic Program Guide (EPG) user interface (UI) on a page-by-page basis according to the user input;
wherein a page of the EPG UI comprises a list comprising broadcast channels and a content advertisement for a content provider (CP) channel where content is provided by a content provider, the content advertisement being inserted between the broadcast channels, and
wherein the method further comprises in response to returning to the page of the EPG UI after a page conversion according to a user browsing command, displaying the page of the EPG UI without the content advertisement.

10. The control method of claim 9, further comprising:
inserting into the EPG UI the content advertisement having a form in which a plurality of CP channels provided by the content provider are grouped together, and displaying the group together with the broadcast channels.

11. The control method of claim 10, further comprising:
in response to selecting the channel group, displaying, on a display, a channel list for browsing a plurality of CP channels within the channel group.

12. The control method of claim 9, wherein the EPG UI comprises an area providing a continuous viewing function for viewing a content that has been displayed before the EPG UI is displayed, and
wherein the method further comprises:
in response to a selection of the content advertisement, displaying content corresponding to the selected content advertisement in the continuous viewing area.

13. The control method of claim 9, wherein the EPG UI comprises an area providing a continuous viewing function for viewing a content that has been displayed before the EPG UI is displayed; and
the method further comprising:
in response to a selection GUI being positioned on the content advertisement, providing a content corresponding to the content advertisement in the continuous viewing area.

14. The control method of claim 13, further comprising:
in response to the selection GUI returning to the broadcast channel on the EPG UI, providing a continuous viewing function for viewing the content that has been displayed before the EPG UI is displayed.

15. The control method of claim 9, further comprising storing in a memory of the broadcast receiving apparatus a CP channel list comprising a plurality of CP channels being sequentially arranged, wherein at least one of the plurality of CP channels comprises the CP channel information which is advertisement information provided by a respective content provider.

16. A control method of the broadcast receiving apparatus, the control method comprising:
receiving a user input; and
displaying an Electronic Program Guide (EPG) user interface (UI) on a page-by-page basis according to the user input;
wherein a pace of the EPG UI comprises a list comprising broadcast channels and a content advertisement for a content provider (CP) channel where content is provided by a content provider, the content advertisement being inserted between the broadcast channels, and
wherein the method further comprises in response to returning to the page of the EPG UI after a page conversion according to a user browsing command, displaying content advertisement different from the content advertisement previously displayed.

* * * * *